Figure 1:
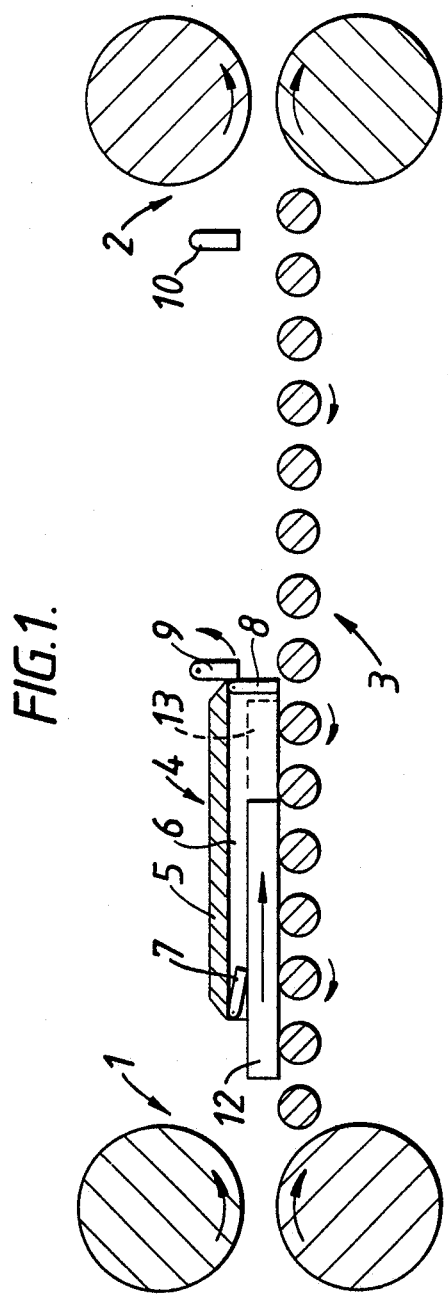

United States Patent [19]

Watson

[11] Patent Number: 4,811,588

[45] Date of Patent: Mar. 14, 1989

[54] HEAT CONSERVATION OF HOT METAL SLABS

[75] Inventor: James T. Watson, Chepstow, United Kingdom

[73] Assignee: British Steel plc., United Kingdom

[21] Appl. No.: 176,770

[22] Filed: Apr. 1, 1988

[30] Foreign Application Priority Data

Apr. 15, 1987 [GB] United Kingdom ............... 8709133

[51] Int. Cl.⁴ ..................... B21B 43/00; B21B 45/00
[52] U.S. Cl. .......................................... 72/202
[58] Field of Search .............. 72/128, 200, 201, 202, 72/364, 365

[56] References Cited

FOREIGN PATENT DOCUMENTS 0181740  5/1986  European Pat. Off. .
1603428  11/1981  United Kingdom .

*Primary Examiner*—E. Michael Combs
*Attorney, Agent, or Firm*—Bacon & Thomas

[57] ABSTRACT

A method of shielding metal slabs from heat loss during inter-stand transport in a rolling mill with an inverted channel-shaped heat-insulating housing. The housing is sited over the roller table at a first position adjacent an upstream mill stand and is so dimensioned as to accommodate a slab entering through the trailing end of the housing as it issues from the stand; control means is provided operable (a) to cause the housing to travel along the table with the slab, (b) to arrest the housing adjacent the downstream mill stand whereby the slab exits thereto through the leading end of the housing and (c) to return to its said first position.

20 Claims, 2 Drawing Sheets

HEAT CONSERVATION OF HOT METAL SLABS

This invention relates to conserving heat in metal slabs. eg steel slabs, in hot rolling mills, in particular during inter-stand transport.

In order to conserve the temperature of the stock during hot rolling provision has been made in many instances to shield the mill run, that is to erect a series of contiguous removable heat insulating panels over the roller tables in the form of a tunnel.

This form of protection however, is not an ideal solution from the point of view of energy conservation or for either minimising heat losses from the stock or equalising the temperature of same, quite apart from accessibility of the roller tables. In particular, with discrete stock—as distinct from 'continuous' strip or plate—such as hot slabs issuing from a roughing or slabbing mill there is a fair interval of time between the passage of one slab and the next. In this interval the 'tunnel' which has been heated by the passage of the previous slab, cools and thus the next slab to pass through necessarily loses heat to the enveloping panels. Depending on the mode of rolling, heat losses can be different at the leading end and trailing ends giving rise to a temperature differential between front and back with the prospect of metallurgical or gauge tolerance problems arising.

It is an object of this invention to provide an improved method of conserving heat in slab rolling.

From one aspect, the present invention consists in a method of shielding metal slabs from heat loss during inter-stand transport in a rolling mill with an inverted channel-shaped heat-insulating housing, in which the housing is sited over the roller table at a first position adjacent an upstream mill stand and is so dimensioned as to accommodate a said slab, the slab being transported along the table and entering through the trailing end of the housing as it issues from the upstream stand, control means being provided operable (a) to cause the housing to travel along the table with the slab, (b) to arrest the housing adjacent the downstream mill stand whereby the slab exits thereto through the leading end of the housing and (c) to return the housing to its said first position.

Preferably, the housing has flaps at its leading and trailing ends.

The control means may move the housing into and out of contact with the roller table to realise conditions (a) and (b) above, respectively, or alternatively the housing may be in permanent contact with the roller table the control means incorporating a braking function to realise said conditions (a) and (b); the housing may most conveniently be returned to its position adjacent the upstream will stand by reversal of the roller table drive.

More than one housing may be sited between stands so that collectively they shield the whole of the slab in the form of a 'train' as the slab is elongated to a length greater than that of a single housing on its passage through the mill. The dimensions of the housings, more particularly their height, may differ between adjacent stands so as to maintain the optimum clearance and thus the most efficient heat conservation.

This invention thus provides a most efficient method of conserving heat in slabs during the inter-stand transport the use of a number of housings having individually tailored dimensions facilitating ready adaption and flexibility to accomodate a variety of different circumstances. Further, the provision of the housing or shield over the slab realises an additional benefit when de-scaling in the roughing stands in the sense that the water and scale is deflected on to the top of the housing away from the surface of the slab by the leading end flaps.

Figure 2:
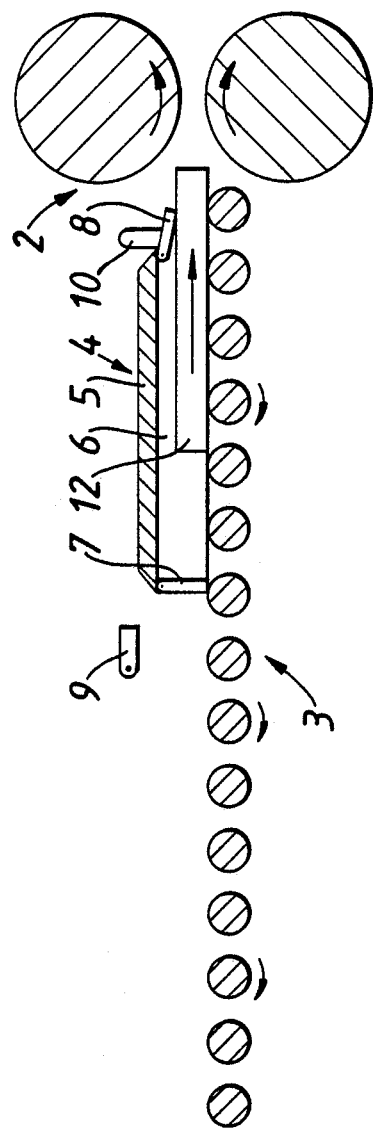

In order that the invention may be fully understood, one embodiment thereof will now be described by way of example, with reference to the accompanying schematic drawings, in which:

FIG. 1 illustrates a slab entering a heat-insulating housing as it issues from an upstream mill stand, and FIG. 2 illustrates the slab issuing from the housing as it is about to enter the downstream mill stand.

Referring now to FIG. 1 there is shown an upstream mill stand 1, a downstream mill stand 2, a roller table 3 and a heat-insulated housing 4 sited on this table. The housing has an insulated top 5 and sides 6 in the form of a channel and insulated pivotal end flaps 7, 8. As shown, it lies in its rest position stationary against the drive of the roller table, being arrested by the pivotal stop 9. A further stop 10 is shown adjacent the stand 2.

In operation, a slab 12 issues through the first (upstream) mill stand and is driven by the roller table 3 through the trailing end flap 7. As it approaches the leading end of the housing—to the chain linked position 13—the stop 9 is activated and pivots to its release position whereupon the housing is driven forwardly along with the slab, the slab being sited wholly within the housing. The heat radiated from the slab is thus contained and conserved within the housing during the whole of the inter-stand span.

As the housing/slab approaches the stand 2 the housing is arrested against the fixed stop 10 but the rolls continue to drive the slab, the slab issuing through the flap 8 and into the bite of the rolls in the downstream mill stand—see FIG. 2. As soon as the slab is under traction from the stand 2 the roller table is reversed and the housing is transported back to its 'rest' position adjacent the upstream stand and the stop 9 is returned to its de-activated state, as shown in FIG. 1.

The housing may conveniently be constructed from heat insulating ceramic fibre together with heat reflecting panels etc.

The illustrations show the housing located for reciprocable movement between two "roughing" stands but it may likewise also be introduced between the reheat furnace and the first roughing stand. If de-scaling is effected here with, say, high pressure water sprays these are projected at the slab as it issues from the leading end of housing so that the water and scale is directed on to the top (5) of the housing, conserving the surface integrity of the slab and its temperature.

More than one housing may be sited in the form of a "train" between stands, particularly in the downstream mill stands where the slab is elongated and might otherwise protrude from the housing end.

Although the invention has been described with reference to the particular embodiment illustrated it is to be understood that various changes may readily be made, particularly with regard to the control function. For example, it may be more convenient to lift the housing into and out of contact with the roller table rather than employ stops and keep the housing permanently on the table as shown, since this would mitigate wear and reduce 'drag' and noise. Such raising and lowering of the housing could readily be effected by lever arms extending between the rollers from below the table. Alternatively, a lifting mechanism could be employed from above eg. an electromagnetic device.

We claim:

1. A method of shielding metal slabs from heat loss during inter-stand transport on a roller table in a rolling mill comprising:

positioning an inverted channel-shaped heatinsulating housing over the roller table at a first position adjacent an upstream mill stand, introducing the metal slab through a trailing end of the housing as the slab issues from the upstream mill stand onto said roller table until the slab is completely within the housing and in contact with said roller table, maintaining the slab in contact with said roller table while transporting the housing and slab together along the roller table to a second position adjacent a downstream mill stand, removing the metal slab from the housing through a leading end of the housing and returning the housing to said first position.

2. The method of claim 1, wherein said housing comprises insulating ceramic fiber panels.

3. The method of claim 1, wherein said housing comprises heat reflecting panels.

4. The method of claim 1, wherein said housing comprises heat insulating ceramic fiber panels and heat reflecting panels.

5. The method of claim 1, wherein said housing is returned to said first position by reversing the transport direction of the roller table.

6. The method of claim 1, wherein said housing is in permanent contact with the roller table at least when the slab is transported with the housing from said first position to said second position.

7. The method of claim 6, wherein said housing is moved out of contact with the roller table when it is returned to said first position.

8. The method of claim 1, wherein said housing has pivotal flaps at its leading and trailing ends to permit removal and introduction of the metal slabs.

9. The method of claim 8, wherein said slab is disposed within said housing so as to maintain the optimum clearance with the slab to afford the most efficient heat conservation.

10. The method of claim 1, wherein said housing is comprised of two or more units in mutual contact in the form of a train, the length of which is sufficient to house the metal slab.

11. An apparatus for shielding metal slabs from heat loss during inter-stand transport on a roller table in a rolling mill comprising:

a heat-insulating housing disposed over the roller table and movable between a first position adjacent an upstream mill stand and a second position adjacent a downstream mill stand, said housing being so dimensioned as to completely envelop a metal slab on the roller table, said metal slab being maintained in contact with said roller table, and control means for causing the housing to travel along the roller table between said first and second positions with the metal slab enveloped therein, and in contact with the roller table for arresting the housing adjacent the downstream mill stand at said second position and for returning the housing to said first position.

12. The apparatus of claim 11, wherein said housing comprises heat insulating ceramic fiber panels.

13. The apparatus of claim 11, wherein said housing comprises heat reflecting panels.

14. The apparatus of claim 11, wherein said housing comprises heat insulating ceramic fiber panels and heat reflecting panels.

15. The apparatus of claim 11, wherein said housing is in permanent contact with the roller table at least during the period for which the slab is transported thereby between the upstream and downstream mill stands.

16. The apparatus of claim 11, wherein said control means includes a unit for causing the housing to travel along the roller table with the metal slab enveloped therein and for arresting the housing adjacent the downstream mill stand at said second position.

17. The apparatus of claim 11, wherein said control means is operative to move the housing into and out of contact with the roller table.

18. The apparatus of claim 11, wherein said housing has pivotal flaps at its leading and trailing ends.

19. The apparatus of claim 11, wherein the dimensions of said housing are such as to maintain optimum clearance with the metal slab to afford the most efficient heat conservation.

20. The apparatus of claim 11, wherein said housing is comprised of two or more units in mutual contact in the form of a train the length of which is sufficient to house the metal slab.

* * * * *